United States Patent [19]

Fujita et al.

[11] 4,080,427

[45] Mar. 21, 1978

[54] METHOD OF DESULFURIZING EXHAUST GASES BY WET LIME-GYPSUM PROCESS

[75] Inventors: Hiroshi Fujita; Koso Tao; Atsushi Tatani, all of Hiroshima; Tsutomer Kabumoto, Musashino, all of Japan

[73] Assignee: Mitsubishi Jukogyo Kabushiki Kaisha, Tokyo, Japan

[21] Appl. No.: 714,176

[22] Filed: Aug. 13, 1976

[30] Foreign Application Priority Data

Sep. 10, 1975  Japan ............................... 50-109005

[51] Int. Cl.$^2$ .................. C01B 17/00; C01F 5/40; C01F 11/46
[52] U.S. Cl. ................................... 423/242; 423/166
[58] Field of Search .......................... 423/242–244, 423/166, 555

[56] References Cited

U.S. PATENT DOCUMENTS 3,533,748  10/1970  Finter et al. ................ 423/242 X
3,785,119   1/1974  McIlvaine .................... 423/242 X Primary Examiner—Earl C. Thomas
Assistant Examiner—Gregory A. Heller

[57] ABSTRACT

A method of desulfurizing exhaust gases by a wet lime-gypsum process comprises the steps of neutralizing a suitable amount of liquid containing impurities separating the neutralized material into solid and liquid phases, heating the separated solid phase to dryness while concentrating the separated liquid phase, mixing the concentrated liquid and dried solid phase in such a manner that the resulting mixture exists as a solid mass containing the impurities, thus making it unnecessary to dispose of any waste liquid.

3 Claims, 1 Drawing Figure

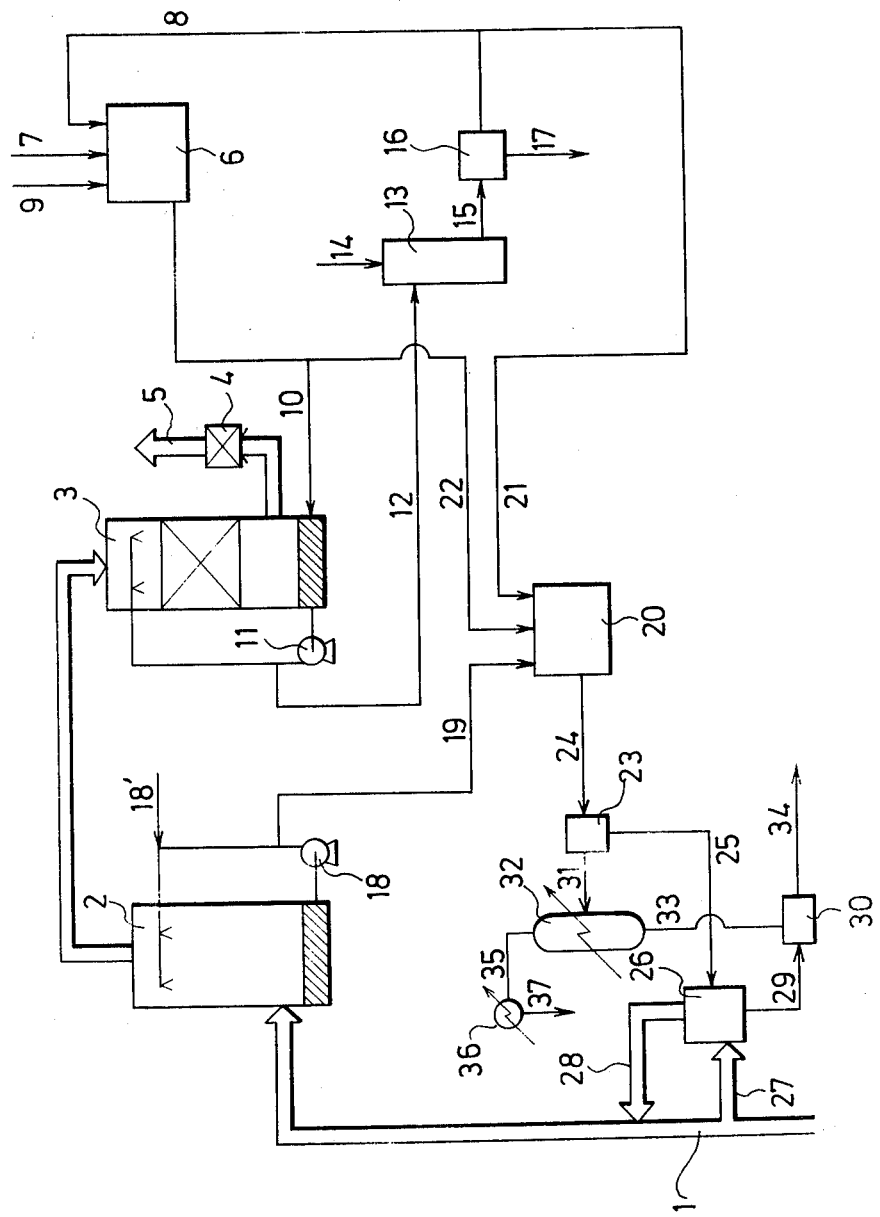

METHOD OF DESULFURIZING EXHAUST GASES BY WET LIME-GYPSUM PROCESS

This invention relates to improvements in the wet processes for treatment of exhaust gases, and more specifically to a method of disposing of the used, waste liquid from a system for desulfurizing the gases by the wet lime-gypsum process.

In wet processes for treating exhaust gases, for example by desulfurization, it is essential to remove the waste water that contains impurities originating from the exhaust gases, treating materials, industrial water, and the like, in order to prevent accumulation of the foreign matter and ensure stable operation of the equipment. However, the liquid removed in this way has a strong possibility of causing secondary pollution such as water contamination. In the desulfurization of exhaust gases by the lime-gypsum process, for example, the waste liquid containing impurities, such as dust and chlorine from the exhaust gases, chlorine from industrial water, and manganese and other impurities from the added lime, is neutralized, the neutralized liquid is separated into solid and liquid phases, and then the filtrate is discharged to prevent these impurities from accumulating within the system. For the neutralization, slaked lime slurry is used and, as a result, the waste water contains highly soluble $CaCl_2$, $MgSO_4$, $(NH_4)_2SO_4$ (where ammonia is introduced into the system) and, moreover, the COD value is high.

In the belief that the best way of avoiding the foregoing drawbacks in the known processes is to perform the exhaust gas treatment by the wet process without any draining of waste water from the system, we have made intensive and extensive researches and have now perfected this invention.

The fundamental object of this invention, therefore, is to provide a wet process for exhaust gas treatment without the discharging of used, waste liquid, thereby avoiding secondary pollution.

A further object of the invention is to provide a method of treating exhaust gases by a wet process characterized in that (1) the waste liquid is concentrated by evaporation, (2) dust and other solids separated from the liquid are dried by making use of the heat of the exhaust gases being treated or the like, (3) the dried solids and concentrated liquid are mixed to form a solid containing the impurities, whereby elimination of any waste liquid discharge is accomplished, and (4) the evaporated water is recovered as make-up feed for introduction into the initial treating step.

The present invention resides, in essence, in a method of desulfurizing exhaust gases by a wet lime-gypsum process which comprises the steps of neutralizing a liquid containing impurities, separated the neutralized material into solid and liquid phases, heating the separated solid phase to dryness while concentrating the separated liquid phase, mixing the said concentrated liquid and dried solid phase in such a manner that the resulting mixture exists as a solid mass containing the impurities, so that no liquid is drained from the system.

These and other objects, features, and advantages of the invention will become apparent from the following description taken in conjunction with the accompanying drawing.

The single FIGURE is a flow sheet of a system for practicing the method of the invention.

In the arrangement shown, the exhaust gases to be treated are introduced from a line 1, passed through a cooling tower 2, an absorption column 3, and a demister 4, and are finally discharged as clean gases through a line 5. For the preparation of the lime slurry used in the absorption column, an absorbent preparation tank 6 is supplied with quicklime from a line 7, gypsum-separated liquid from a line 8, and make-up feed from a line 9. The quicklime is thus slaked to a $Ca(OH)_2$ slurry adapted to absorb SOx. The slurry is fed through a line 10 to the absorption column 3, where it is conveyed by a circulating pump 11 to the upper part of the vessel and then sprayed in continuous operation.

Part of the slurry containing impurities is removed from the absorption column 3 by the operation of liquid-level control, and is sent via a line 12 to an oxidation column 13, which is also supplied with sulfuric acid from a line 14. The slurry extracted from the absorption column contains removed calcium hydroxide and calcium sulfite formed by the absorption of $SO_2$ in the absorption column 3, and in this oxidation column the calcium hydroxide reacts with sulfuric acid while the calcium sulfite is air-oxidized to gypsum.

From the oxidation column 13, the slurry is led through a line 15 into separator 16, where it is separated into by-product gypsum and gypsum-separated filtrate. The former is taken out through a line 17, while some of the latter is recycled through a line 8 to the absorbent preparation tank 6.

The exhaust gases to be treated are in many cases hot gases at about 150° C, for example, from oil-fired boilers and contain dust in addition to SOx and NOx. These gases are humidified, cooled, and dedusted in the cooling tower 2 where make-up feed from a line 18' is being sprayed and recycled by a circulating pump 18.

The cooling of the exhaust gases with the addition of moisture causes evaporation of a large volume of water, with consequent concentration and accumulation of impurities (SOx, HCl and dust) in the liquid being sprayed and recycled.

Of various impurities which may thus build up, those which will offer problems of particular importance by reason of quantity are, for example where exhaust gases from oil-fired boilers are handled, ammonium sulfate resulting from the injection of ammonia, and chlorine which will cause corrosion of the apparatus. In order to avoid the accumulation of these impurities in high concentrations, a part of the liquid being circulated through the cooling tower is removed through the line 19 into a neutralization tank 20 continuously during the operation.

The neutralization tank 20 is also supplied with a part of the gypsum-separated filtrate removed from the separator 16. The gypsum-separated filtrate contains the impurities carried by quicklime and those carried by the gases at the outlet of the cooling tower and subsequently collected in the slurry in the absorption column, and, if the total amount, instead of a part, of this filtrate is recycled to the absorbent preparation tank 6, the said impurities will undesirably be accumulated in the circulatory system of the absorption of column.

The liquid being conducted through line 21 to the neutralization tank 20 is saturated with gypsum and, in addition, it contains COD-source substances, Mg, Cl and other impurities accumulated in considerable proportions. The neutralization tank 20 is supplied with $Ca(OH)_2$ slurry from the absorbent preparation tank 6 through a line 22 to neutralize the liquids removed from the cooling tower and the gypsum-separated filtrate. While the neutralized liquid mixture is desired to have a pH value in the vicinity of neutrality, it may be intentionally made alkaline where the exhaust gases from an oil-fired boiler are being treated with the injection of ammonia and therefore the liquid removed from the cooling tower contains large amounts of ammonium, sulfate, bisulfate, sulfite, and bisulfite. As a result of the ensuing substitution reactions, ammonia gas can be recovered and $HSO_4^-$, $SO_4^{2-}$, $SO_3^{2-}$, and $HSO_3^-$ are converted to solid calcium salts of low solubility.

When ammonia is not used, the liquid removed from the cooling tower is usually acidic with sulfuric acid, ranging in pH from 0.5 to 2.0, and various metallic impurities are present in the form of sulfates. These impurities react with the $Ca(OH)_2$ in the neutralization tank 20 so that $SO_4^{2-}$ deposits as gypsum and most of the cations deposit as metallic hydroxides. The deposit composition in most cases is mainly $CaSO_4.2H_2O$.

The substances that do not deposit a solids in the neutralization tank 20 are chlorides with high solubility, and when the liquid charge of the vessel is not made alkaline, Mg salts. The COD value of the liquid will often be higher than the local standard value of treated wastewater. The slurry from the neutralization tank that contains a predominant amount of gypsum and lesser amounts of other solids is transferred to a solid-liquid separator 23 via a line 24, and is separated therein into a sludge and a separated filtrate.

With prior art systems for treating exhause gases, it has been impossible to reuse such a separated filtrate because of its chloride content. As already noted, the concentration of chlorides can increase seriously due to accumulation by recycling, and this is not desirable because of their corrosive attack on the apparatus. Furthermore, the impurities are generally so varied and diversified that recycling of the separated liquid has posed a number of problems, in addition to those already pointed out, in the operation of the ordinary plants for exhaust gas treatment. For example, the separated filtrate cannot be reused as make-up feed to the cooling tower. This is ascribable to the fact that the filtrate includs a gypsum-saturated liquid which contains chlorides, COD-source substances, and in some cases Mg compounds and other soluble substances, and evporation of water in the cooling tower results in concentration and accumulation of these substances, which in turn can cause troubles with scale. Moreover, it is often the case with the existing equipment for exhaust gas treatment that the liquid must be drained to maintain the water balance in the system.

In an endeavour to prevent secondary pollution by the substances contained in the waste liquid being drained, it has been the practice to keep the concentration multiplying factor of the cooling tower liquid low so that the COD of the liquid is well within the local control standard range. Make-up feed usually produces a slight inflow of COD-source substances, and it is known that, if a water balance which will increase the concentration multiplying factor of the liquid with the evaporation of water is adopted, the COD of the waste liquid to be discharged is increased in direct proportion to the factor. To restrict the concentration multiplying factor within a proper range, therefore, steps have heretofore been taken to increase the amount of such liquid to be drained.

In order to improve the conventional wet process for exhaust gas treatment which involves draining of used liquid, the present invention proposes a unique method characterized by the following arrangement.

The sludge taken out of the solid-liquid separator 23 is sent to a drier 26 via a line 25. In the drier 26 either the whole or a part of the exhaust gases introduced through a line 27 is used as a heat source for heating and drying the sludge. The water evaporated thereby leaves the drier 26, together with the exhaust gases, through a line 28. Although the drier 26 is shown as employing a part of the exhaust gases as a heat source, this is not a limitation to the invention; any other method may be adopted for the purpose of heating and drying the sludge. Since its solid content is mostly $CaSO_4.2H_2O$, the sludge is heated to dryness at upwards of 105° C, or the point where the hemihydrate (calcined gypsum) results. The dry solids composed chiefly of calcined gypsum are then sent by way of a line 29 to a mixer 30.

Meanwhile, the neutral separated liquid from the solid-liquid separator 23 is led through a line 31 to a concentrator 32, where it is separated into evaporated water and concentrated residual liquid. The latter then enters the mixer 30 through a line 33, and is mixed therein with the dry solids (mostly calcined gypsum) from the drier 26. In the mixer 30 the calcined gypsum reacts with water to form a solid dihydrate. This phenomenon is taken advantage of in forming a solid, hardened gypsum mass in which all of the impurities are contained, and the solid is discharged through a line 34.

The water evaporated from the concentrator 32 flows through a line 35, a cooler 36, and thence through a line 37 for reuse as make-up feed for the process.

By the procedure described above, wet exhaust gas desulfurization is carried out without the need of draining the used, waste liquid. In addition, the total consumption of make-up feed is economized and the possibility of secondary pollution is eliminated.

EXAMPLE

Exhaust gases from a boiler burning fuel oil at the rate of 2000 $Nm^3$ an hour were desulfurized by the lime-gypsum process with a pilot plant designed in accordance with this invention.

The plant was operated under the following conditions:

| | |
|---|---|
| Inlet gas temperature | 150° C |
| Inlet SOx concentration | 1040 ppm |
| Inlet dust concentration | 66 mg/$Nm^3$ |
| Rate of spray liquid circulation through cooling tower | 4 $m^3$/hr (liquid-gas ratio: 2l/Nm3) |

Measurements of related conditions were as follows:

| | |
|---|---|
| Cooling tower outlet gas temp. | 55° C |
| Cooling tower circ. liquid temp. | 55° C |
| Cooling tower outlet SOx conc. | 1018 ppm |
| Cooling tower outlet dust conc. | 28 mg/$Nm^3$ |

As the exhaust gases were humidified and cooled in the cooling tower, the circulating liquid for spray was evaporated at the rate of 98 l/hr. The circulating liquid became acidic with sulfuric acid due to absorption of SOx. To avoid excessive accumulation of dust and sulfuric acid, a part of the circulating liquid was continuously drained at the rate of 10 l/hr. Accordingly, the rate of make-up feed to the cooling tower was 108 l/hr.

The dust-laden, blackish liquid thus removed was of the following composition:

| | |
|---|---|
| pH | 0.9 |
| Total $SO_3^{2-}$ | 0.000 mol/l |
| $Cl^-$ | 1900 ppm |
| Total $SO_4^{2-}$ | 0.160 mol/l |
| COD | 78 ppm |
| SS | 7300 ppm |

When the removed liquid was directly heated and concentrated under reduced pressure, it was found to develop HCl gas and form a highly viscous, concentrated liquid containing crystalline solids, and it had a very strong acidity without the slightest tendency for solidification.

With this in view, the removed liquid was neutralized with $Ca(OH)_2$ and was concentrated with heat and under reduced pressure. A solid mass extremely easy to handle resulted, while the evaporated water was condensed and recovered as distilled water. $CaSO_4.2H_2O$ accounted for 67% of the solid mass thus obtained.

The pilot plant included an absorption column using $Ca(OH)_2$ slurry as the absorbent, an oxidation column, and a centrifuge, and the respective operating conditions and test results were as set forth below:

| | |
|---|---|
| Absorption column: | |
| Lime slurry circ. rate | 14m³/hr (liquid-gas ratio: 7 l/Nm³) |
| Slurry temp. | 55° C |
| Inlet SOx conc. | 1018 ppm |
| Outlet SOx conc. | 31 ppm |
| Circ. slurry conc. | [Ca] = 0.4 mol/l |
| $Ca(OH)_2$ slurry feed rate | 220l/hr |
| Slurry removal flow rate | 220l/hr |
| Removed slurry composition | |
| $CaCO_3$ | 0.03 mol/l |
| $CaSO_3$ | 0.251 mol/l |
| $CaSO_4$ | 0.141 mol/l |
| Mg | 0.034 mol/l |
| Cl | 210 ppm |

The oxidation column, which was equipped with a rotary atomizer, treated the slurry removed from the absorption column by aeration at the rate of 20 Nm³/hr, while $H_2SO_4$ was pumped into the vessel so that the oxidation column slurry was acidified to pH 4.0.

Oxidation column outlet slurry composition

| | |
|---|---|
| $CaSO_4$ | 0.395 mol/l |
| Mg | 0.034 mol/l |
| Cl | 210 ppm |

The slurry taken out of the oxidation column was conducted to the centrifuge, and by-product gypsum was recovered. The moisture content of the gypsum was 8% by weight.

Almost all of the separated filtrate was recycled for the preparation of the absorbent, but a predetermined amount was sent into the neutralization tank in order to prevent the accumulation of impurities, such as the Mg brought in as an impurity of the absorbent and the Cl carried by the gases and make-up feed into the system.

| | |
|---|---|
| Flow rate of gypsum-separated filtrate into neutralization tank | 8 l/hr |
| Gypsum-separated filtrate composition | |
| Ca | 0.015 mol/l |
| $SO_4$ | 0.050 mol/l |
| Mg | 0.034 mol/l |
| Cl | 210 ppm |
| COD | 15 ppm |
| pH | 4.2 |

The gypsum-separated filtrate was conducted, together with the liquid removed from the cooling tower, to the neutralization tank, where a part of the absorbent, $Ca(OH)_2$ slurry, was introduced into the neutralization tank until the pH of the mixed slurry was 7. The neutralized slurry was subjected to solid-liquid separation, and solid and liquid phases were obtained.

Analysis of solid-phase composition (dry sample basis)

| | |
|---|---|
| $CaSO_4.2H_2O$ | 82 wt% |
| Miscellaneous | 18 wt% |

Analysis of the liquid-phase composition

| | | |
|---|---|---|
| pH | 7 | |
| $Cl^-$ | 1100 | ppm |
| $Mg^{2+}$ | 362 | ppm |
| COD | 50 | ppm |
| $SO_4$ | 1800 | ppm |
| Ca | 1220 | ppm |

The solid phase was heated and dried with the exhaust gases at 150° C, and the dihydrate was thereby converted to calcined gypsum $CaSO_4.\frac{1}{2}H_2O$. The by-product calcined gypsum was produced in the solid mass at the rate of 250 g/hr (in terms of $CaSO_4.\frac{1}{2}H_2O$). The calcined gypsum may be mixed with the residual liquid obtained by heating and concentrating the liquid phase separated after the neutralization, (90 parts by volume of the liquid being concentrated to 1 part) to form a hardened gypsum in which all of the impurities are contained. A suitable amount of the liquid to be mixed with the calcined gyspum was about 80% by weight on tha basis of the gypsum weight.

What is claimed is:

1. In a process of removing sulfur oxides from exhaust gas by contacting such gas with moisture in a cooling tower form a liquid effluent and with a lime slurry in an absorption column, with the resultant formation of a liquid effluent containing calcium sulfite and unreacted lime the improvement consisting in the steps of:
    (a) treating said liquid effluent from said absorption column with sulfuric acid to convert said unreacted lime to gypsum and with air to oxidize said calcium sulfite in said effluent to gypsum;
    (b) recovering a liquid filtrate solid gypsum of high purity from the product of (a) by means of filtration;
    (c) passing said liquid filtrate from (b) and said liquid effluent from said cooling tower to a neutralization tank wherein said liquids are neutralized with a lime slurry;
    (d) separating the product of (c) into a solid phase and a liquid phase;
    (e) heating and drying said solid phase with a portion of said exhaust gas containing sulfur "oxides" to form a calcined gypsum;
    (f) concentrating said liquid phase; and (g) mixing said calcined gypsum and the product of (f) to form a solid dihydrate containing impurities removed from said exhaust gas.

2. The method of claim 1, wherein the hot exhaust gas is utilized in heating and drying said solid phase in step (e), and the water evaporated in concentrating said liquid phase in step (f) is recovered for use as make-up feed for introduction into said cooling tower.

3. A method according to claim 2, including the step of recirculating a part of said lime containing effluent containing impurities at the stage of said step (a).

* * * * *

UNITED STATES PATENT AND TRADEMARK OFFICE
CERTIFICATE OF CORRECTION

PATENT NO. : 4,080,427
DATED : Mar. 21, 1978
INVENTOR(S) : Atsushi Tatani et al.

It is certified that error appears in the above-identified patent and that said Letters Patent are hereby corrected as shown below:

On the cover sheet [75] the names of the inventors should read -- ATSUSHI TATANI; HIROSHI FUJITA; KOSO TAO, all of HIROSHIMA; TSUTOMU KABUMOTO, MUSASHINO, all of Japan --

The Patent itself should be in the name of -- TATANI ET AL --

Signed and Sealed this

Eighteenth Day of July 1978

[SEAL]

Attest:

RUTH C. MASON
*Attesting Officer*

DONALD W. BANNER
*Commissioner of Patents and Trademarks*